United States Patent Office 3,172,650
Patented Mar. 9, 1965

3,172,650
ELASTOMER SPRING DEVICES
Jacques Jarret, Le Vesinet, and Jean Jarret, Fourqueux, France, assignors to Societe d'Exploitation des Ressorts Autoamortisseurs Jarret, Paris, France, a limited-liability company
Filed June 13, 1962, Ser. No. 202,108
Claims priority, application France, June 15, 1961, 864,988
5 Claims. (Cl. 267—1)

This invention relates to elastomeric spring devices, sometimes known as "hydrostatic compression" springs, and the principle of which has been disclosed in our U.S. Patent No. 2,800,321. As there described, an elastomer spring device comprises a mass of elastomer completely enclosed within a deformable casing, whereby external forces applied to the casing will cause a reduction in volume of the enclosed body of elastomer. The resulting device therefore works under conditions of hydrostatic compression. Further, by so shaping the casing as to introduce a suitable non-linearity into the compression characteristic of the mass, desirable damping properties can be imparted to the device.

Thus, in one development of the elastomeric spring of our above patent, and as disclosed in our U.S. Patent No. 2,906,525 the deformable casing is provided in the form of an elongated tube of flattened cross section shape, the whole tube being deformed to an arcuate form in a general plane normal to the larger dimensions of the cross sectional contour; further, each end of the arcuate tube is shaped to provide an enlarged, constant-capacity reservoir which imparts the desired non linear compression characteristic and consequent damping properties.

Elastomer spring devices of the type specified have performed with remarkable success in providing a resilient, shock-absorbing connection between relatively displaceable mechanical parts. However, experience has shown that in many practical instances it would be desirable to increase the degree of deformability of the spring device so as to enable it to take up relative displacements of larger amplitude between the parts interconnected by it. While the device of arcuate tubular form described in Patent No. 2,906,525 provides for a total developed arc of the arcuate tube in a range of from 160° to 320°, this is found insufficient to provide the desired degree of amplitude required in certain applications.

It is an object of this invention to provide an elastomer, or hydrostatic-compression spring device of the specified type, having greatly increased deformability as compared to similar devices heretofore constructed, and hence possessing a range of applications to which such earlier devices were unsuited.

Another difficulty encountered with the earlier devices as exemplified by Patent No. 2,906,525 is that the arcuate shape of the casing in many cases makes it impossible to secure the two mechanical parts to be interconnected, in mutually parallel relationship at the respective ends of the casing. Another object of the invention is to permit such parallel relationship between the parts attached to the ends of the spring casing regardless of the over-all deformability imparted to the device.

Two exemplary embodiments of the invention will now be described for purposes of illustration but not of limitation with reference to the accompanying drawings, wherein.

Broadly, in accordance with the invention, the total arcuate extent of the tubular casing enclosing a body of elastomer in an elastomer spring device, may be increased by imparting to the tubular casing a circuitous shape, such as the shape of a curve having at least one inflexion point, i.e. an S-shape, and/or the shape of a spiral, having a progressively increasing radius of curvature. Further, the two features may be combined.

Figure 1:
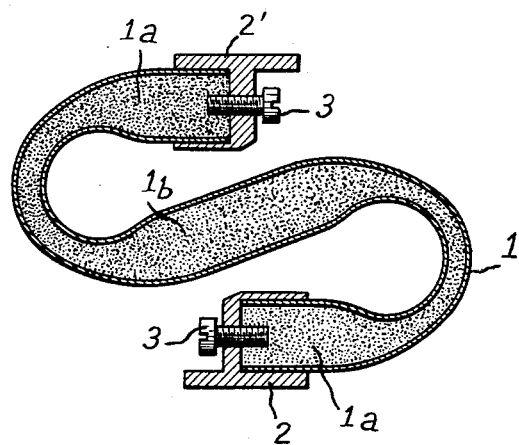
FIG. 1 is a longitudinal sectional view of one embodiment.

Referring to FIG. 1, an S-shaped elastomer spring-device according to this invention comprises a tubular metal casing 1 of non-uniform cross section, filled with a mass of elastomer and sealed at both ends. For an example of a suitable elastomer, reference is made to Patent No. 2,800,321. The casing 1 has enlarged end sections 1a over each of which a rigid sealing cap 2 and 2' is secured and adapted for attachment to the respective mechanical parts that are to be resiliently interconnected. Adjustably engaging each end cap and penetrating into the related end of the body of elastomer is a screw 3 adjustment of which will modify the internal capacity of the enlarged sections 1a and hence the over-all capacity of the device, thereby modifying the resiliency of the resulting spring device. In cross section, the tubular casing largely has an elongated or flattened configuration with the major dimension extending normally to the plane of curvature, i.e. normally to the plane of the paper.

In accordance with this invention, the tubular casing 1 has a circuitous shape, including two reversely arcuate portions interconnected by a substantially straight portion 1b. Preferably, as shown, the straight interconnecting portion 1b is enlarged with respect to the arcuate portions, and may be of circular cross sectional shape whereas the arcuate sections have the flattened contours mentioned above. This arrangement is found to improve the non-linear damping characteristics of the resulting spring device.

It will be evident that with the arrangement described a greatly increased over-all arcuate extent can be imparted to the device, thereby correspondingly increasing the total deformability of the device. In practice, a device of the general shape shown in FIG. 1 can easily be given an over-all developed arc in the range of from 320 to 640°. Further, it will be observed that the two end members 2 and 2' to which the relatively displaceable mechanical parts are respectively affixed, can be easily disposed in the parallel relationship shown, and this relationship may be preserved within a wide range of total deformability values of the spring device, since the arcuate lengths of the arcuate sections 1 may be varied within relatively wide limits to provide the desired deformability while still retaining the aforesaid parallel relationship of the end members. This feature is of considerable advantage in many cases since it makes it possible to provide a simpler and stronger connection with the relatively displaceable parts than would otherwise be possible.

Figure 2:
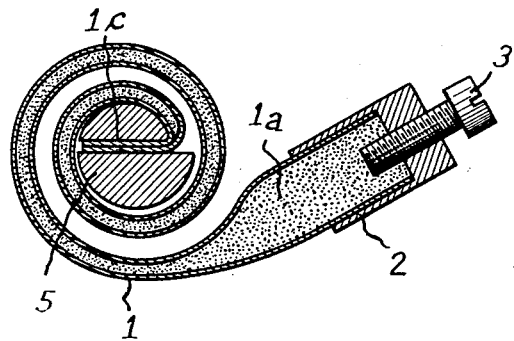
FIG. 2 is a similar view of another embodiment.

Referring to FIG. 2, a spiraloid elastomer spring device comprises an elongated metallic tubular casing 1 having an enlarged end section 1a at one end, sealed by means of an attachment cap 2 and provided with a compression-adjusting screw 3 similar to the embodiment of FIG. 1. The tubular casing 1 beyond the end section 1a is formed to a spiral shape and at its inner end the casing is shown attached to one of the two interconnected parts, by way of a shaft member 5 having a transverse slot in which a flattened end part of the casing 1, free of elastomer, is inserted. It will be understood however that various other forms of attachment may be used. In this case, the casing 1 is shown as having a uniform elongated cross section, with the major dimension normal to the plane of curvature, throughout its length except at the enlarged end section 1a.

It will be clear that the spiral arrangement of FIG. 2 will make it possible theoretically to impart any desired developed arcuate extent to the spring device simply by increasing the number of turns of the spiral. In practice total arcs of 700–800° can be easily attained.

Generally speaking, in producing the improved elastomer spring devices, a cylindrical tube made of suitable metal may first be flattened except in that or those portions where it is desired to provide the cylindrical sections such as 1a and 1b in FIG. 1, and 1a in FIG. 2. These cylindrical sections constitute, in use, constant-capacity "reservoirs" of elastomer, imparting the desired non-linear compression characteristic to the device. The tube is then deformed to the desired circuitous shape, such as the S-shaped configuration in FIG. 1 or the spiral configuration in FIG. 2, and is filled with elastomer by conventional techniques. The ends of the casing are then sealed by any of the means described in FIG. 1 or 2.

It will be understood that various modifications may be made in the devices shown without departing from the scope of the invention. Thus, the two arrangements shown may be combined, as by providing one, or both of the arcuate portions of the tubular casing of FIG. 1, in the form of a spiral somewhat similar to that shown in FIG. 2.

The long-arc, high-deformability, elastomer spring devices of the invention have been found to possess highly valuable characteristics in resiliently interconnecting a pair of mechanical parts liable to assume in service relative displacements of comparatively large amplitude while retaining the damped, elastic, properties required in such connections.

What we claim is:

1. A spring device comprising an elongated tubular casing sealed at both ends, a body of elastomer filling said casing, said casing being bent so as to have two curved portions of reverse curvature and a generally straight interconnecting portion, attaching means for respective ends of said casing adapted to resiliently interconnect a pair of mechanical parts, said curved portions and said interconnecting portion having different cross-sectional configuration, said interconnecting portion having a circular cross-sectional configuration having a larger capacity per unit length than the two curved portions to define a constant capacity reservoir of elastomer for imparting non-linear damping characteristics to the spring device.

2. The invention as recited in claim 1 wherein said attaching means for the respective ends of said casing are disposed in spaced parallel relation.

3. A spring device comprising an elongated tubular casing sealed at both ends, a body of elastometer filling said casing, said casing being bent to form straight and curved portions and having a total developed arcuate extent of more than 360°, attaching means for respective ends of said casing adapted to resiliently interconnect a pair of mechanical parts, said straight and curved portions having different cross-sectional configurations, said straight portion having a circular cross-sectional configuration defining a constant capacity reservoir of elastomer for imparting non-linear damping characteristics to the spring device.

4. The invention as recited in claim 3 wherein said curved portion is a spiral curve having a flattened cross-sectional configuration, an outer end of said spiral curve terminates at said straight portion, said circular cross-sectional configuration has a larger capacity per unit length than the flattened cross-sectional configuration, an inner end of said spiral curve terminates in a flattened part, and one of said attaching means includes a shaft having a slotted end receiving the flattened part to limit tightening of the spiral curve.

5. A spring device comprising an elongated tubular casing sealed at both ends, a body of elastomer filling said casing, said casing being bent so as to have two curved portions of reverse curvature and a generally straight interconnecting portion, attaching means for the respective ends of said casing adapted to resiliently interconnect a pair of mechanical parts, each sealed end including a rectilinear part of circular cross section, each of the two curved portions having a flattened cross section, and the interconnecting portion defining a rectilinear part of circular cross section, the three rectilinear parts having a larger capacity per unit length greater than the two curved portions to define capacity reservoirs of elastomer.

References Cited in the file of this patent

UNITED STATES PATENTS

| | | |
|---|---|---|
| 636,884 | Atwood | Nov. 14, 1899 |
| 1,722,619 | Ziegler | July 30, 1929 |
| 1,798,645 | Withers | Mar. 31, 1931 |
| 2,261,028 | Hopkins | Oct. 28, 1941 |
| 2,333,793 | Johnson | Nov. 9, 1943 |
| 2,626,799 | Howell | Jan. 27, 1953 |
| 2,681,800 | Taylor | June 22, 1954 |
| 2,906,525 | Jarret et al. | Sept. 29, 1959 |

FOREIGN PATENTS

| | | |
|---|---|---|
| 12,889 | Great Britain | of 1849 |
| 569,919 | Great Britain | June 14, 1945 |
| 718,153 | Great Britain | Nov. 10, 1959 |